US009661227B2

(12) United States Patent
Kim

(10) Patent No.: US 9,661,227 B2
(45) Date of Patent: May 23, 2017

(54) METHOD, CIRCUIT AND SYSTEM FOR STABILIZING DIGITAL IMAGE

(71) Applicant: Dong hoon Kim, Seongnam-si (KR)

(72) Inventor: Dong hoon Kim, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 617 days.

(21) Appl. No.: 13/829,139

(22) Filed: Mar. 14, 2013

(65) Prior Publication Data
US 2013/0307937 A1 Nov. 21, 2013

(30) Foreign Application Priority Data

May 15, 2012 (KR) .......................... 10-2012-0051698

(51) Int. Cl.
H04N 5/232 (2006.01)
G06T 5/00 (2006.01)
G06T 7/00 (2017.01)
G06T 7/20 (2017.01)

(52) U.S. Cl.
CPC ......... *H04N 5/23264* (2013.01); *G06T 5/003* (2013.01); *G06T 7/0075* (2013.01); *G06T 7/2013* (2013.01); *G06T 7/2033* (2013.01); *H04N 5/23254* (2013.01); *H04N 5/23267* (2013.01); *G06T 2207/10021* (2013.01)

(58) Field of Classification Search
CPC ........... H04N 5/23264; H04N 5/23267; H04N 5/23254; G06T 5/003; G06T 7/0075; G06T 7/2033; G06T 2207/10021; G06T 7/2013

USPC ...................................... 348/47; 382/55, 255
See application file for complete search history.

(56) References Cited

U.S. PATENT DOCUMENTS 5,502,482 A * 3/1996 Graham .................. G06T 7/004
                                                          348/140
6,118,475 A    9/2000 Iijima et al.
6,384,859 B1   5/2002 Matsumoto et al.
6,584,219 B1   6/2003 Yamashita et al.
(Continued)

FOREIGN PATENT DOCUMENTS

CN      1395231      2/2003
CN    102208110     10/2011
(Continued)

OTHER PUBLICATIONS

Office Action of Chinese Patent Application No. 201310179609.5 issued on Mar. 29, 2016 from S.I.P.O. (in Chinese).

Primary Examiner — Zhihan Zhou
(74) Attorney, Agent, or Firm — F. Chau & Associates, LLC

(57) ABSTRACT

A method of stabilizing a three-dimensional (3D) digital video image sequence includes generating a depth map for each stereoscopic pair of images using each of the image frames in a first-perspective (e.g., left) group and each of the image frames in a second-perspective group (e.g., right) and determining the background regions of each of the depth maps, defining the background regions in each of the image frames in one group among the first-perspective and second-perspective groups using the determined background regions, and calculating first global motion vectors between the consecutive image frames in the one group using only pixels of the defined second background regions.

21 Claims, 11 Drawing Sheets

(56) References Cited

U.S. PATENT DOCUMENTS

| | | | |
|---|---|---|---|
| 6,611,268 B1 * | 8/2003 | Szeliski | G06T 13/80 345/420 |
| 7,949,193 B2 | 5/2011 | Ahn et al. | |
| 7,956,898 B2 | 6/2011 | Chen et al. | |
| 9,131,155 B1 * | 9/2015 | Dolgin | H04N 5/23248 |
| 2009/0096878 A1 * | 4/2009 | Chen | H04N 5/144 348/208.6 |
| 2009/0231449 A1 * | 9/2009 | Tzur et al. | 348/208.6 |
| 2010/0231593 A1 * | 9/2010 | Zhou et al. | 345/428 |
| 2011/0007136 A1 | 1/2011 | Miura et al. | |
| 2011/0193941 A1 * | 8/2011 | Inaba et al. | 348/46 |
| 2011/0285826 A1 * | 11/2011 | Bickerstaff et al. | 348/47 |
| 2012/0127270 A1 * | 5/2012 | Zhang et al. | 348/43 |
| 2012/0218442 A1 * | 8/2012 | Jandhyala et al. | 348/239 |
| 2013/0033612 A1 * | 2/2013 | Wu et al. | 348/208.6 |
| 2014/0002596 A1 * | 1/2014 | Antonio | H04N 19/597 348/43 |

FOREIGN PATENT DOCUMENTS

| | | | | |
|---|---|---|---|---|
| EP | 2261858 | | 12/2010 | |
| JP | 2004-152133 | | 5/2004 | |
| JP | 2007074042 | | 3/2007 | |
| JP | 2011-197452 | | 10/2011 | |
| KR | 1020050066400 | | 6/2005 | |
| TW | 200625203 | | 7/2006 | |
| WO | WO 2011155704 A2 * | | 12/2011 | H04N 19/597 |

* cited by examiner

IF1  IF2

BG1  FG  DM

☐ Block

IF1-1　　GMV

IF1-2

→ Frame Shift
--→ Global Motion Vector

METHOD, CIRCUIT AND SYSTEM FOR STABILIZING DIGITAL IMAGE

CROSS-REFERENCE TO RELATED APPLICATION

This application claims priority under 35 U.S.C. §119(a) from Korean Patent Application No. 10-2012-0051698 filed on May 15, 2012, which is hereby incorporated by reference in its entirety.

TECHNICAL FIELD

Embodiments of the inventive concept relate to a three-dimensional (3D) technique, and more particularly, to a method, circuit and system for stabilizing digital images used in the 3D display technique.

DISCUSSION OF THE RELATED ART

A 3D display technique relates to providing 3D images to a viewer using a 3D display device. For instance, the 3D display technique may be stereoscopics. Stereoscopics is a technique for creating or enhancing the illusion of depth in an image by presenting two offset images (stereo images) separately to the left and right eye of the viewer. The two stereo images may be captured (e.g., simultaneously) and recorded by a device like a camera or a pair of cameras. A plurality of stereo images may be recorded in a sequence by a device like a stereo video camera or a pair of video cameras. Each of the two cameras is in a different physical position relative to the other and relative to the scene, and thus, each camera has a slightly different perspective. When the two offset images are recorded by a handheld device, hand shaking or trembling may cause frame-to-frame jitter in recorded video. Therefore, digital image stabilization (DIS) of 3D video is desirable to remove the jitter.

SUMMARY

According to an aspect of the inventive concept, there is provided a method of stabilizing a digital image. The method includes receiving image frames in a first-perspective group and image frames in a second-perspective group and generating each of a plurality of depth map using one image frame in the first-perspective group and the timewise-corresponding image frame in the second-perspective group; and determining the background region in each of the depth maps, defining the background regions in each of the image frames in a selected one group among the first-perspective and second-perspective groups using the determined background regions, and calculating first global motion vectors between pixels in the defined background region of the image frames in the one group (e.g., using each of the defined background regions as a mask). The method may further include selecting the one group according to image resolution.

The determining of the background regions in each of the depth maps may include comparing a depth value of each pixel in the depth map with a depth threshold value and determining each pixel to be within the background region in each of the depth maps according to results of the comparison.

The calculating the first global motion vectors may include calculating local motion vectors between two consecutive frames among the image frames in the one group using each of the second background regions and calculating one of the first global motion vectors from the local motion vectors using a filter. The filter may be a gaussian filter, a median filter, or a mean filter.

The calculating the local motion vectors may calculate the local motion vectors based on block matching. The calculating the local motion vectors may include calculating the local motion vectors based on feature point correspondence.

The method may further include outputting the first global motion vectors to an encoder.

The method may further include compensating for motion of the image frames in the first-perspective group and motion of the image frames in the second-perspective group using the first global motion vectors.

The method may further include defining the background regions in each of the image frames in the other group among the first-perspective and second-perspective groups using each of the determined background regions and calculating second global motion vectors between pixels in the defined background region of the image frames in the other group (e.g., using each of the defined background regions as a mask).

The method may further include selecting the first global motion vectors or the second global motion vectors according to the magnitude (e.g., according to a magnitude change) of each of the first global motion vectors and the magnitude (e.g., according to a magnitude change) of each of the second global motion vectors.

The selecting the first global motion vectors or the second global motion vectors may include calculating the difference between magnitudes of two consecutive vectors among the first global motion vectors and the difference between magnitudes of two consecutive vectors among the second global motion vectors, comparing the differences with a magnitude threshold value, and selecting the first global motion vectors or the second global motion vectors according to a result of the comparison.

The method may further include compensating for motion of the image frames in the first-perspective group and motion of the image frames in the second-perspective group using the selected global motion vectors.

According to an aspect of the inventive concept, there is provided a digital image stabilization device including a depth map generator configured to generate each depth map using one image frame in a first-perspective group and one image frame in a second-perspective group and to determine t-the background region in each of the depth maps, a selector configured to select one group between the first-perspective group and the second-perspective group according to image resolution, a background setup unit configured to define the background regions in each of the image frames in the selected group using the determined background regions, and a motion estimator configured to calculate global motion vectors between the pixels within the defined background regions of image frames in the selected group (e.g., using each of the defined background regions as a mask).

The digital image stabilization device may further include a first motion compensator configured to compensate for jitter motion of the image frames in the first-perspective group using the global motion vectors and a second motion compensator configured to compensate for jitter motion of the image frames in the second-perspective group using the global motion vectors.

The motion estimator may include a local motion estimation unit configured to calculate local motion vectors between pixels in the defined background regions of two consecutive frames among the image frames in the selected group (e.g., using the defined background region in at least one of the consecutive image frames as a mask) and a global motion estimation unit configured to calculate one of the global motion vectors from the local motion vectors using a filter.

The digital image stabilization device may be an image signal processor.

According to an aspect of the inventive concept, there is provided a digital image stabilization system including image sensors and a digital image stabilization device configured to receive first-perspective image frames and second-perspective image frames from the image sensors. It may further include the jitter-motion compensator circuits described herein.

The digital image stabilization system may further include a three-dimensional (3D) formatter configured to convert image frames output from the motion compensators into a 3D format and to output 3D display frames and an encoder configured to compress the 3D display frames using the global motion vectors output from the motion estimator. The digital image stabilization system may be a 3D display device.

According to an aspect of the inventive concept, there is provided a digital image stabilization device including a depth map generator configured to generate depth maps, each depth map being generated using each one of first-perspective image frames and each one of corresponding of second-perspective image frames and to determine the background regions in each of the depth maps, a background setup block configured to define the background regions in each of the first-perspective image frames (e.g., using the determined background region of the corresponding depth map) and to define the background regions in each of the second-perspective image frames (e.g., using the determined background region of the corresponding depth map), and a motion estimation block configured to calculate first global motion vectors between pixels within the defined background region of the first-perspective image frames and to calculate second global motion vectors between pixels within the defined background region of the second-perspective image frames.

The digital image stabilization device may further include a comparator configured to select the first global motion vectors or the second global motion vectors according to a magnitude (e.g., magnitude change) of each of the first global motion vectors and a magnitude (e.g., magnitude change) of each of the second global motion vectors and motion compensators configured to compensate the selected global motion vectors.

The digital image stabilization device may be an image signal processor.

According to an aspect of the inventive concept, there is provided a digital image stabilization system including a first image sensor, a second image sensor, and a digital image stabilization device configured to receive first-perspective image frames and second-perspective image frames from the first and second image sensors, respectively.

The digital image stabilization system may comprise a 3D display device.

BRIEF DESCRIPTION OF THE DRAWINGS

Illustrative, non-limiting exemplary embodiments will be more clearly understood from the following detailed description taken in conjunction with the accompanying drawings, in which.

DETAILED DESCRIPTION OF THE EXEMPLARY EMBODIMENTS

Figure 1:
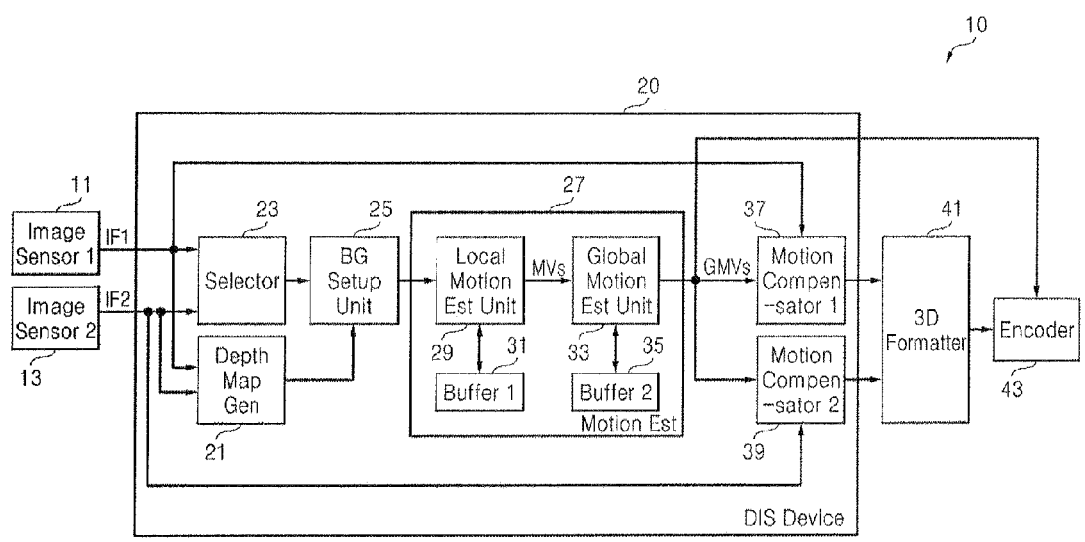
FIG. 1 is a block diagram of a digital image stabilization (DIS) system according to an embodiment of the inventive concept.
Figure 2:
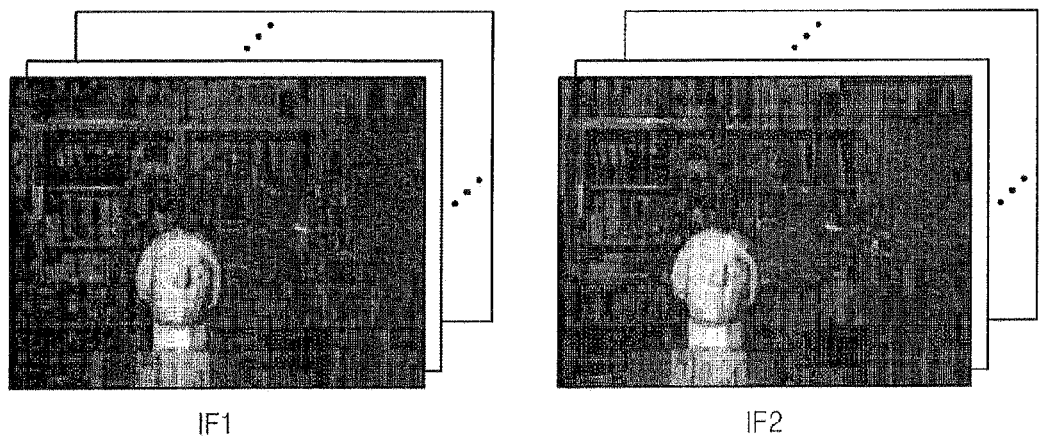
FIG. 2 is a diagram of a plurality of (stereo) video frames output from the stereo pair of image sensors in the DIS system of FIG. 1.

FIG. 1 is a block diagram of a digital image stabilization (DIS) system 10 according to an embodiment of the inventive concept. FIG. 2 is a diagram of a sequence of a plurality of stereo video frames output from a plurality (e.g., stereo pair) of image sensors 11 and 13 in the DIS system of FIG. 1. Referring to FIGS. 1 and 2, the DIS system 10 may be a three-dimensional (3D) display device that can present a 3D image to a viewer. The digital image stabilization system 10 may comprise or be incorporated in a digital camera, a tablet personal computer (PC), or a smart phone.

The DIS system 10 includes a plurality of the image sensors 11 and 13, a DIS circuit 20, a 3D formatter 41, and an encoder 43.

A sequence of a plurality of stereo video image frames IF1 and IF2 may be respectively generated by imaging devices like the image sensors 11 and 13. A plurality of the first image frames IF1 (e.g., IF1-1, IF1-2, IF1-3, IF1-4 etcetera) may be sequentially generated by the first image sensor 11 and a plurality of the second image frames IF2 (e.g., IF2-1, IF2-2, IF2-3, IF2-4 etcetera) may be sequentially generated by the second image sensor 13. The sequences of stereo image frames IF1 and IF2 are captured and processed to provide a video sequence of 3D images to a viewer.

The image frames IF1 and IF2 may be a sequence of left images and a sequence of corresponding (e.g., simultaneously captured) right images, which are suitable to be used in stereoscopics. Each of the image frames in IF1 and in IF2 is a digital image. Each of the image frames in IF1 and IF2 may be referred to as an image or as a video frame. There are two image sensors 11 and 13 in the current embodiment, but the number of image sensors may vary with various embodiments.

Jitter may be caused by hand shaking or trembling and may be observable in the image frames IF1 and IF2. Therefore, the DIS circuit 20 is used to eliminate the jitter.

The DIS circuit 20 includes a depth map generator 21, a selector 23, a background setup unit 25, a motion estimator 27, and a plurality of motion compensators 37 and 39.

The depth map generator 21 receives one of the first image frames IF1 and one of the second image frames IF2 and generates a depth map using each stereo pair of image frames among the first image frames IF1 and second image frames IF2. Each of the depth maps is an image including pixel data indicating the distance between objects in the image and the image sensors 11 and 13.

Figure 3:
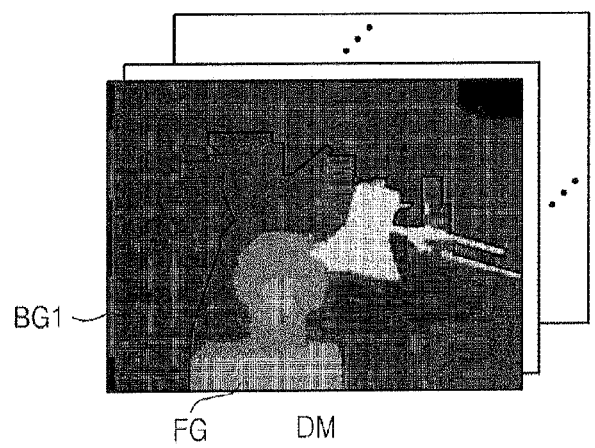
FIG. 3 is a diagram illustrating a plurality of depth maps generated from plurality of (stereo) video frames by the depth map generator in the DIS system of FIG. 1.

FIG. 3 is a diagram illustrating a plurality of depth maps generated from plurality of (stereo) video frames (IF1 and IF2) by the depth map generator 21 in the DIS system of FIG. 1. Referring to FIGS. 1 through 3, the depth map generator 21 compares stereo pairs among the first image frames IF1 and the second image frames IF2, and sequentially generates the plurality of depth maps DM. Each of the depth maps DM may be expressed as array of depth values (e.g., a plurality of bits) or a frame of gray scale values. As an object (e.g., a bookshelf) gets farther away from the image sensors 11 and 13, its depth value in the depth maps DM gets darker.

The depth map generator 21 may compare the depth value of each pixel of the depth maps DM with a depth threshold value and detect each of first background regions (or dark gray regions) BG1 in each of the depth maps DM. For instance, when the depth value of a pixel is greater than the depth threshold value of the depth map DM, the depth map generator 21 defines that pixel within the first background region BG1 in the depth map DM. When the depth value of a pixel is less than the depth threshold value of the depth map DM, the depth map generator 21 defines that pixel within a foreground region FG in the depth map DM. In other words, the depth map generator 21 may divide the pixels in the depth map DM into the first background region BG1 and the foreground region FG according to the comparison results. In FIG. 3, the first background region BG1 includes books and bookshelves and the foreground region FG includes a plaster figure and a lamp stand. Alternatively, when the depth value of a pixel is less than the depth threshold value of the depth map DM, the depth map generator 21 may decide a pixel is in the first background region BG1 in the depth map DM.

Alternatively, the selector 23 may select the image frames IF1 or the image frames IF2 according to image resolution. For instance, when the image resolution of the first image frames IF1 is higher than that of the second image frames IF2, the selector 23 may select the first image frames IF1.

Figure 4:
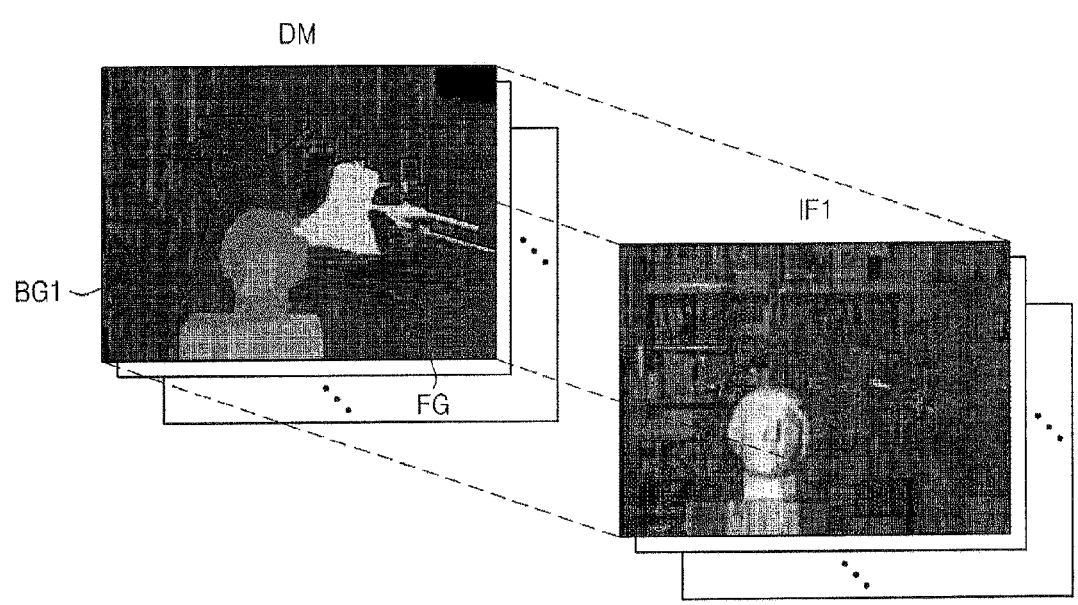
FIG. 4 is a diagram of depth maps and corresponding image frames for explaining the operation of a background setup unit in the DIS system of FIG. 1.

FIG. 4 is a diagram of depth maps DM and the corresponding image frames IF1 for explaining the operation of the background setup unit 25 illustrated in FIG. 1. Referring to FIGS. 1 through 4, the background setup unit 25 defines pixels in each of the image frames (e.g., IF1) selected by the selector 23 into second background regions BG2 using each of the first background regions BG1 in each depth map DM. Each of the image frames (e.g., IF1) selected by the selector 23 is masked by each of the first background region BG1 set in each of the depth map DM, to obtain the second background regions BG2.

In other words, the background setup unit 25 extracts each of the second background regions BG2 from each of the image frames IF1 selected by the selector 23.

Referring to FIG. 1, the motion estimator 27 calculates a plurality of global motion vectors (GMVs) between sequential image frames (e.g., IF1-1 & IF1-2 of IF1) selected by the selector 23 using each of second background regions BG2.

The motion estimator 27 includes a local motion estimation unit 29 and a first buffer 31. The local motion estimation unit 29 calculates a plurality of local motion vectors (MVs) between two frames (e.g., IF1-1 & IF1-2) among the selected image frames (e.g., IF1) using each of second background regions.

Figure 5:
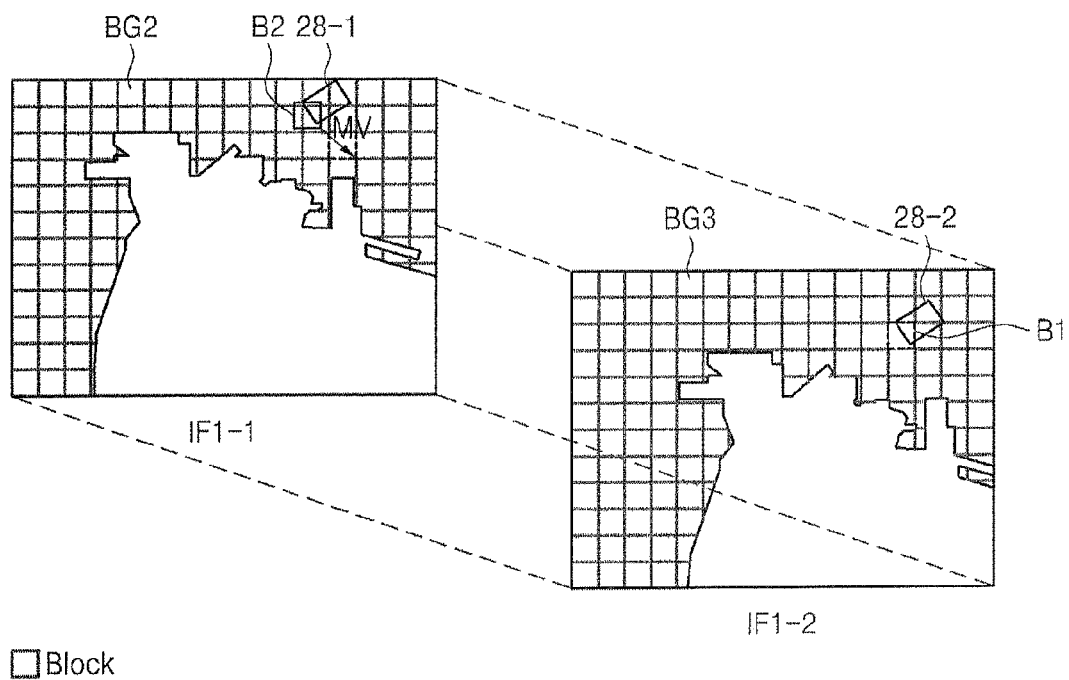
FIG. 5 is a diagram illustrating the estimation of a plurality of local motion vectors estimated by the local motion estimation unit in the DIS system of FIG. 1.

FIG. 5 is a diagram illustrating a plurality of exemplary local motion vectors MVs estimated by the local motion estimation unit 29 in the DIS system of FIG. 1. Referring to FIGS. 1 through 5, the local motion vectors MVs may be calculated based on block matching. The term block matching refers to a block matching algorithm.

Referring to FIG. 5, background regions BG2 and BG3 of respective sequential image frames IF1-1 and IF1-2 may be divided into a plurality of blocks. The size of the blocks may vary. The image frames IF1-1 and IF1-2 are two of the first image frames IF1 illustrated in FIG. 2. The images in each of image frames IF1-1 and IF1-2 are shown simplified in FIG. 5. Quadrangles 28-1 and 28-2 in the respective backgrounds BG2 and BG3 denote partial images (e.g., a partial book image or a partial bookshelf image) of the backgrounds BG2 and BG3, respectively.

The local motion estimation unit 29 finds a-blocks (e.g., B2) in the image frame IF1-1 that are best matches with the blocks (e.g., B1) in the image frame IF1-2. The local motion estimation unit 29 finds in the image frame IF 1-1 the block B2 best matching with the block B1 in the image frame IF 1-2 and estimates displacement of the block B2 in the image frame IF1-1 as its local motion vector.

Although only one local motion vector MV is illustrated in FIG. 5 for convenience's sake in this detailed description, a block best matching with many or all of the blocks in the image frame IF1-2 may be performed to find matching blocks in the image frame IF1-1. A plurality of local MVs estimated by the local motion estimation unit 29 may be stored in the first buffer 31. Alternatively, the local motion estimation unit 29 may estimate a single local motion vector MV between the backgrounds BG2 and BG3. The local motion vector MV (singular or plural) calculated by the local motion estimation unit 29 is considered as representing a global motion vector between the backgrounds BG2 and BG3.

Figure 6:
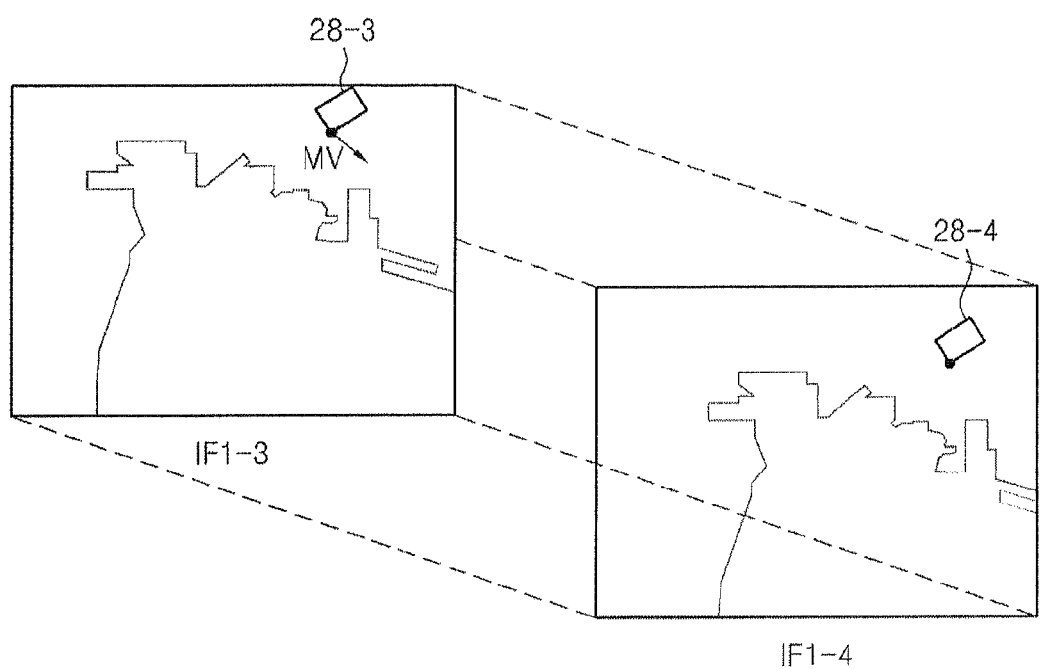
FIG. 6 is a diagram illustrating the estimation of a plurality of local motion vectors estimated by the local motion estimation unit using detected feature points in the DIS system of FIG. 1.

FIG. 6 is a diagram of an exemplary local MV estimated by the local motion estimation unit 29 in the DIS system of FIG. 1. Referring to FIGS. 1 through 4 and FIG. 6, the images in a plurality of image frames IF1-3 and IF1-4 are shown simplified. Quadrangles 28-3 and 28-4 in respective backgrounds denote partial images (e.g., a partial book image or a partial bookshelf image) of the backgrounds, respectively.

The local motion vectors MVs may be calculated based on point correspondence. The point correspondence refers to any point correspondence algorithm now known or to be developed by persons skilled in the art. The point correspondence may be referred to as feature point correspondence or a feature correspondence algorithm.

The local motion estimation unit 29 detects at least one feature point in each of background regions of the image frames IF1-3 and IF1-4. For instance, the local motion estimation unit 29 may detect an corner of an object (e.g., book) visible in each of the background regions. The at least one feature point is used in point description. In other words, the local motion estimation unit 29 may describe the at least one point as color. The color is expressed as a plurality of bits.

The local motion estimation unit 29 finds in the image frame IF1-3 the at least one point best corresponding to the at least one point in the image frame IF1-4. The local motion estimation unit 29 finds in the image frame IF1-4 the point best corresponding to the point in the image frame IF1-3 and estimates a vector of the image frame IF1-3 as a local motion vector MV.

For convenience's sake in the detailed description, only one local motion vector MV is illustrated in FIG. 6. The motion estimator 27 may also include a global motion estimation unit 33 and a second buffer 35.

The global motion estimation unit 33 calculates one of the global motion vectors GMVs from the plurality of local motion vectors MVs using a filter. The filter may be a gaussian filter, a median filter, or a mean filter. In other words, the global motion estimation unit 33 calculates the global motion vectors GMVs between the selected image frames (e.g., IF1-1 & IF1-2 among IF1). The global motion vectors GMVs may be stored in the second buffer 35.

Figure 7:
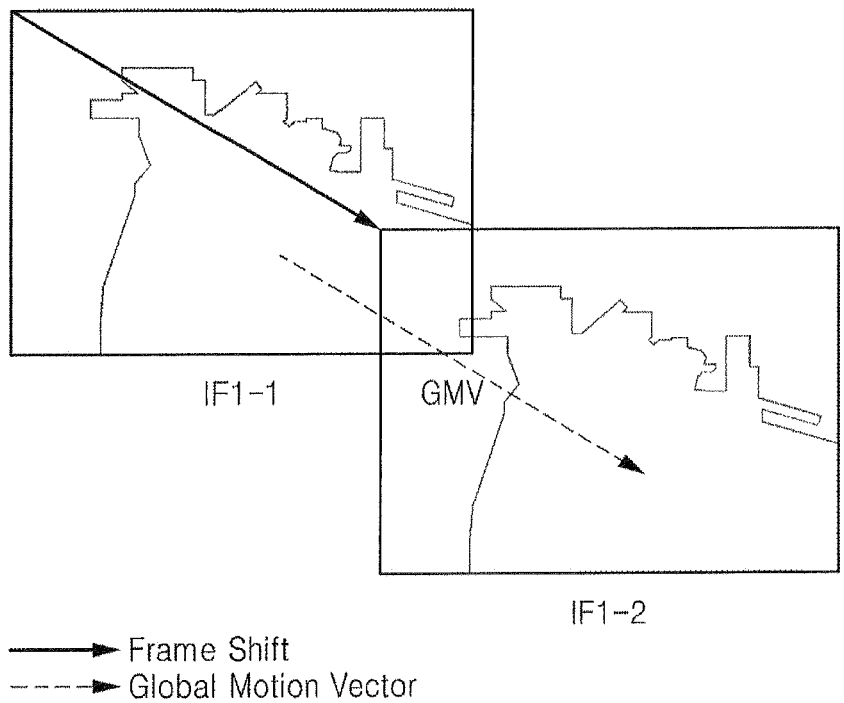
FIG. 7 is a diagram of the global (jitter) motion of an image frame being compensated by the first motion compensator in the DIS system of FIG. 1.

FIG. 7 is a diagram of an image frame sequence (IF1-1 & IF1-2) that has been compensated for global motion (jitter) by the first motion compensator 37 illustrated in FIG. 1. Referring to FIGS. 1 and 7, the image frames IF1-1 and IF1-2 are two consecutive frames among the plurality of the image frames IF1 illustrated in FIG. 2.

The first motion compensator 37 compensates for the jitter motion of the first image frames IF1 using the GMVs. For instance, the first motion compensator 37 compensates for the motion of the first image frame IF1-1 using one of the GMVs. The first motion compensator 37 may compensate for the motion of the first image frame IF1-1 by shifting the first image frame IF1-1. Similarly, the second motion compensator 39 compensates for the jitter motion of the second image frames IF2 using the same global motion vectors GMVs.

Figure 8:
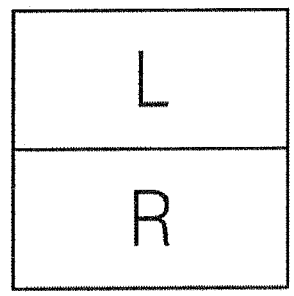
FIG. 8 is a diagram of a three-dimensional (3D) image format generated by the 3D formatter in the DIS system of FIG. 1.

FIG. 8 is a diagram of a 3D image format generated by the 3D formatter 41 illustrated in FIG. 1. Referring to FIGS. 1 and 8, the 3D formatter 41 converts image frames output from the motion compensators 37 and 38 into one of various 3D formats. For instance, each of the first image frames IF1 compensated by the first motion compensator 37 may be positioned at the top and each of the corresponding second frames IF2 compensated by the second motion compensator 39 may be positioned at the bottom.

Referring to FIG. 1, the encoder 43 compresses a plurality of 3D display frames output from the 3D formatter 41 using the global motion vectors GMVs output from the motion estimator 27.

Figure 9:
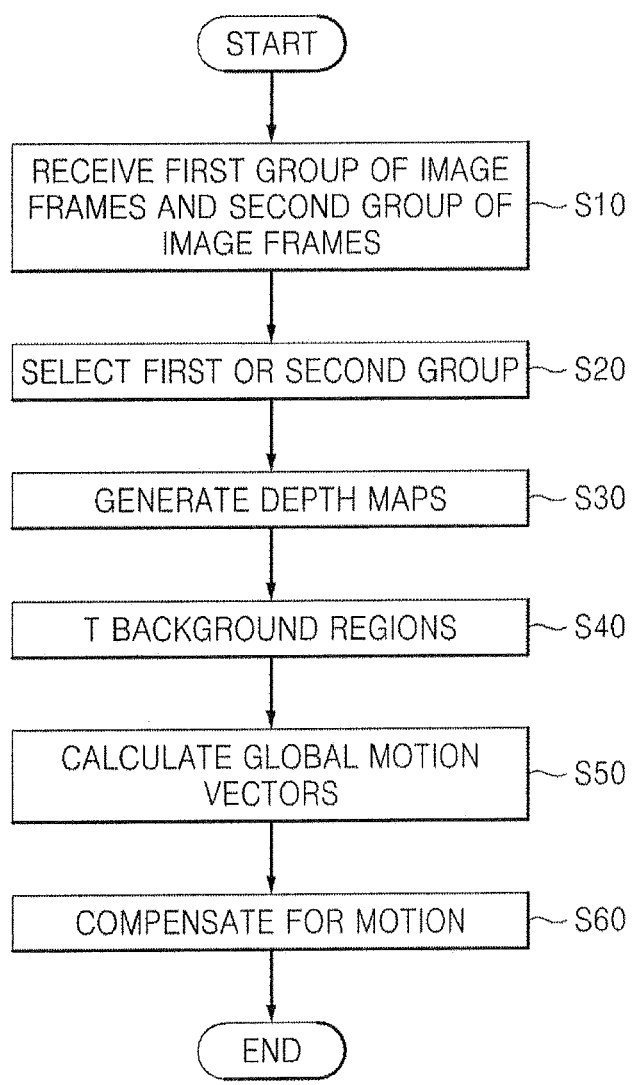
FIG. 9 is a flowchart of the operation of the digital image stabilization (DIS) device of FIG. 1.

FIG. 9 is a flowchart of the operation of the DIS circuit 20 illustrated in FIG. 1. Referring to FIGS. 1 through 9, the DIS circuit 20 receives a first-perspective group of the image frames IF1 and a second-perspective group of the image frames IF2 from the stereo image sensors 11 and 13, respectively, in step S10. The selector 23 selects the first-perspective group or the second-perspective group in step S20.

The depth map generator 21 generates each of depth maps DM using each of the first-perspective image frames IF1 in the first-perspective group and the corresponding frames among the second-perspective image frames IF2 in the second-perspective group in step S30. The depth map generator 21 defines the first background region BG1 in each of depth maps DM. In step S40, the background setup unit 25 defines a second background region BG2 in each of image frames in the selected group using the first background region BG1.

In step S50, the motion estimator 27 calculates first global motion vectors between image frames in the selected group using second background regions BG2. In step S60, the motion compensators 37 and 39 compensate for the motion (jitter) of the image frames IF1 in the first-perspective group and for the same motion (jitter) of the image frames IF2 in the second-perspective group, respectively, using the first global motion vectors GMVs.

Figure 10:
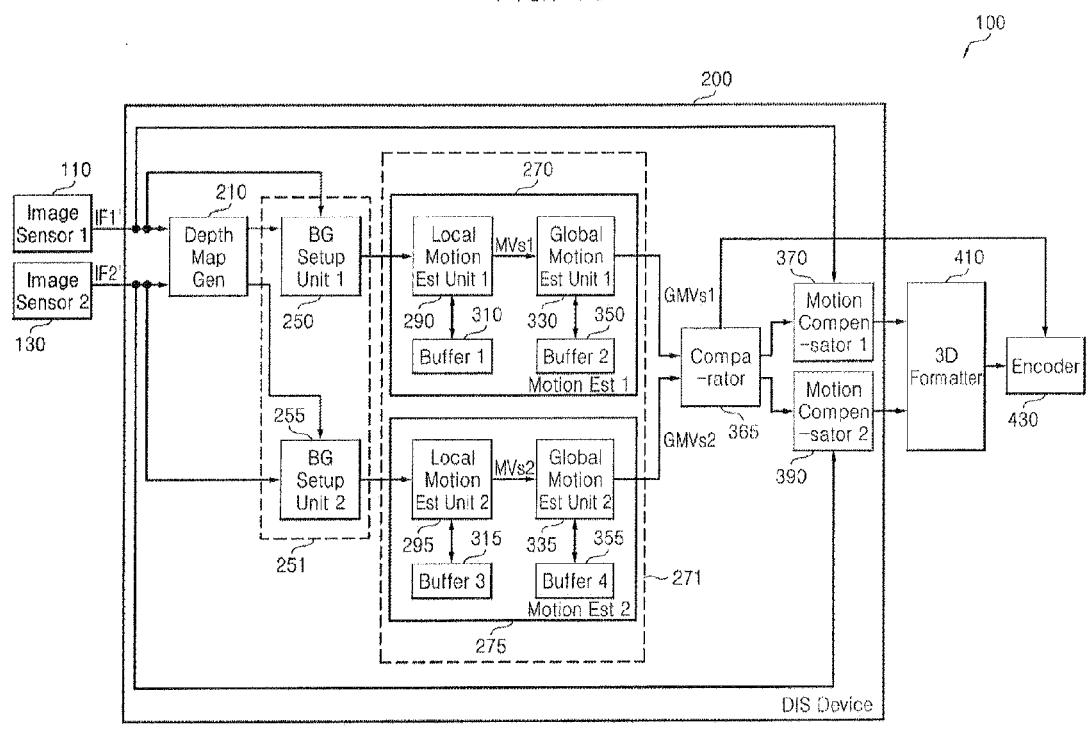
FIG. 10 is a block diagram of a digital image stabilization (DIS) system according to an embodiment of the inventive concept.

FIG. 10 is a block diagram of a DIS system 100 according an embodiment of the inventive concept. Referring to FIG. 10, the DIS system 100 includes a plurality (e.g., pair) of image sensors 110 and 130, a DIS circuit 200, a 3D formatter 410, and an encoder 430.

The names and the functions of the image sensors 110 and 130, the 3D formatter 410, and the encoder 430 are the same as those of the image sensors 11 and 13, the 3D formatter 41, and the encoder 43 illustrated in FIG. 1, respectively. Thus, redundant descriptions thereof will be omitted.

The DIS circuit 200 includes a depth map generator 210, a background setup block 251, a motion estimation block 271, a comparator 365, and a plurality of motion compensators 370 and 390.

The depth map generator 210 compares each one among plurality of first image frames IF1' with a corresponding one among the plurality of second image frames IF2', respectively, to generate the plurality of depth maps and defines the first background region BG1 in each of the depth maps. The image frames IF1' and IF2' and the depth maps are similar to the image frames IF1 and IF2 illustrated in FIG. 2 and the depth maps DM illustrated in FIG. 3.

The operation of the depth map generator 210 is similar to that of the depth map generator 21 illustrated in FIG. 1. Thus, redundant descriptions thereof will be omitted.

The background setup block 251 includes a first background setup unit 250 and a second background setup unit 255.

The first background setup unit 250 sets each of second background regions in each of the first image frames IF1' using each of first background regions set in each of the depth maps. The second background setup unit 255 sets each of third background regions in each of the second image frames IF2' using each of first background regions set in each of depth maps. In other words, each of second background regions is masked on each of the first image frames IF1' based on the depth maps and each of third background regions is masked on each of the second image frames IF2' based on the depth maps.

The motion estimation block 271 includes a first motion estimator 270 and a second motion estimator 275. The first motion estimator 270 calculates a plurality of first global motion vectors GMVs between the first image frames IF using the second background regions. The first motion estimator 270 includes a first local motion estimation unit 290 and a first buffer 310.

The first local motion estimation unit 290 calculates a plurality of first local motion vectors MVs1 between two consecutive frames among the first image frames IF1' using the second background regions of the two consecutive frames. The first local motion vectors MVs1 may be stored in the first buffer 310. Alternatively, the first local motion estimation unit 290 may estimate a single local motion vector. At this time, the single local motion vector is considered as a global motion vector. The first motion estimator 270 may also include a first global motion estimation unit 330 and a second buffer 350.

For each pair of consecutive frames among the first image frames IF1' the first global motion estimation unit 330 calculates one first global motion vector GMVs1 from the plurality of the first local motion vectors MVs1 using a filter. The operations of the first local motion estimation unit 290 and the first global motion estimation unit 330 are similar to those of the local motion estimation unit 29 and the global motion estimation unit 33 illustrated in FIG. 1. Thus, redundant descriptions thereof will be omitted. The first global motion vectors GMVs1 may be stored in the second buffer 350.

For each pair of consecutive frames among the second image frames IF2', the second motion estimator 275 calculates one second global motion vectors between consecutive second image frames IF2' using the third background regions. The second motion estimator 275 includes a second local motion estimation unit 295 and a third buffer 315. The second local motion estimation unit 295 calculates a plurality of second local motion vectors MVs2 between two consecutive frames among the second image frames IF2' using each of the third background regions of the two frames. The second local motion vectors MVs2 may be stored in the third buffer 315.

Alternatively, the second local motion estimation unit 295 may estimate a single local motion vector. At this time, the single local motion vector is considered as a global motion vector. The second motion estimator 275 may also include a second global motion estimation unit 335 and a fourth buffer 355.

For each pair of consecutive frames among the second image frames IF2', the second global motion estimation unit 335 calculates one second global motion vector GMVs2 from the plurality of the second local motion vectors MVs2 using a filter. The second global motion vectors GMVs2 may be stored in the fourth buffer 355.

Figure 11A:
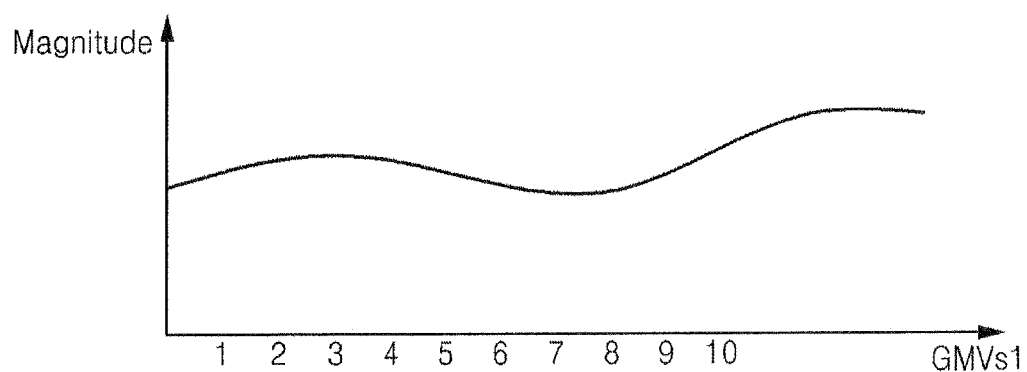
FIGS. 11A and 11B are distribution graphs of a plurality of global motion vectors generated by of the pair of global motion estimation units in the DIS system of FIG. 10.
Figure 11B:
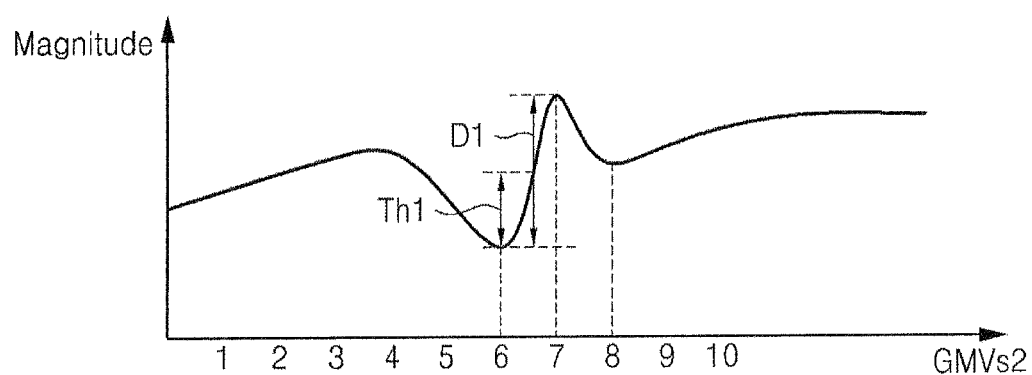

FIGS. 11A and 11B are distribution graphs of a plurality of GMVs generated by a plurality of the global motion estimation units 350 and 355 illustrated in FIG. 10 in the case of jitter. FIG. 11A is the distribution graph of magnitudes of the first global motion vectors GMVs1 and FIG. 11B is the distribution graph of magnitudes of the second global motion vectors GMVs2.

Referring to FIGS. 10 through 11B, the comparator 365 selects the first global motion vectors GMVs1 or the second global motion vectors GMVs2 according to the magnitudes of the first global motion vectors GMVs1 and the magnitudes of the second global motion vectors GMVs2.

For example, the comparator 365 may calculate the difference between the magnitudes of two consecutive first global motion vectors GMVs1 and the difference between the magnitudes of two consecutive second global motion vectors GMVs2 and compares the differences with a magnitude threshold value. The comparator 365 selects the first global motion vectors GMVs1 or the second global motion vectors GMVs2 according to the comparison result. For instance, if the difference D1 between the magnitudes of sixth and seventh global motion vectors among the second global motion vectors GMVs2 is greater than a magnitude threshold value Th1, the comparator 365 selects the first global motion vectors GMVs1.

Referring to FIG. 10, the first motion compensator 370 compensates for the motion of the first image frames IF1' using the selected global motion vectors.

The second motion compensator 390 compensates for the motion of the second image frames IF2' using the selected global motion vectors. The operations of the motion compensators 370 and 390 are similar to those of the motion compensators 37 and 39. Thus, detailed descriptions thereof will be omitted.

Figure 12:
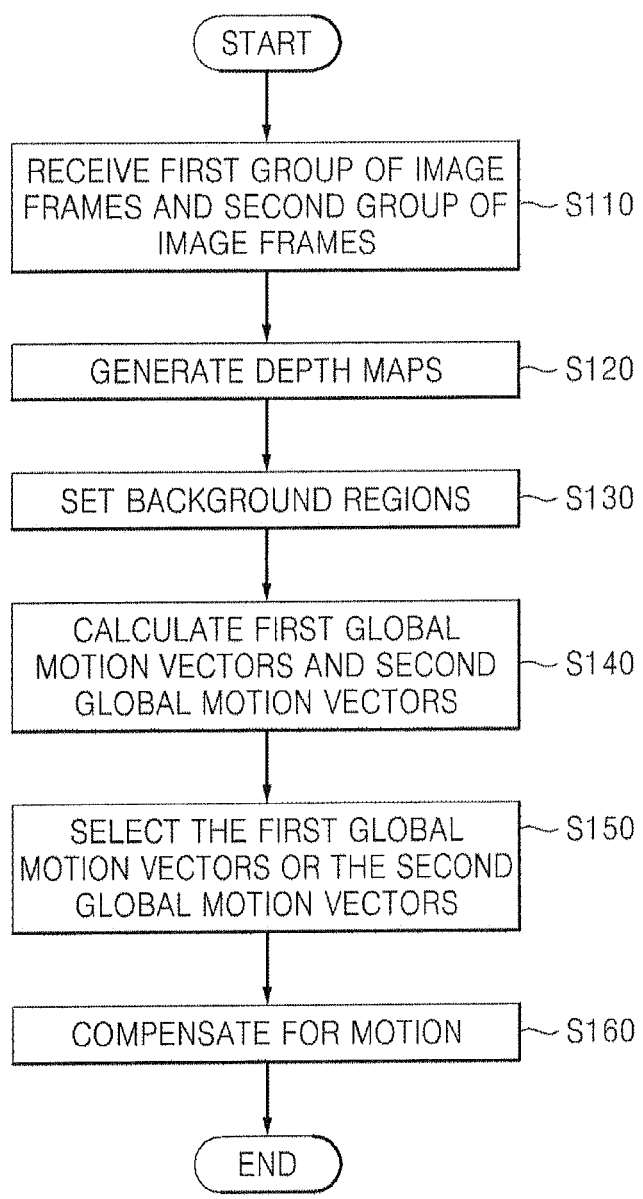
FIG. 12 is a flowchart of the operation of the DIS system of FIG. 10.

FIG. 12 is a flowchart of the operation of the DIS circuit 200 illustrated in FIG. 10. Referring to FIGS. 10 through 12, the DIS circuit 200 receives a first-perspective group of the image frames IF1' from the image sensor 110 and a second-perspective group of the image frames IF2' from the image sensor 130 in step S110.

The depth map generator 210 generates each of depth maps using each of the image frames IF1' in the first-perspective group and each of the image frames IF2' in the second-perspective group in step S120. The depth map generator 210 sets each of third background regions in the depth maps. The background setup block 251 sets each of second background regions in each of the image frames IF1' and each of third background regions in each of the image frames IF2' using each of the third background regions in step S130.

The motion estimation block 271 calculates a plurality of the first global motion vectors GMVs1 between a plurality of image frames IF1' using each of second background regions in the image frames IF1' and calculates a plurality of the second global motion vectors GMVs2 between a plurality of image frames IF2' using each of third background regions in the image frames IF2' in step S140. The comparator 365 calculates a difference between the magnitudes of two of the first global motion vectors GMVs1 and a difference between the magnitudes of two of the second global motion vectors GMVs2 and compares the differences with a magnitude threshold value. The comparator 365 selects the first global motion vectors GMVs1 or the second global motion vectors GMVs2 according to the comparison result S150. The first motion compensator 370 compensates for the motion of the image frames IF1' using global motion vectors that have been selected. The second motion compensator 390 compensates for the motion of the image frames IF2' using global motion vectors that have been selected in step S160.

Figure 13:
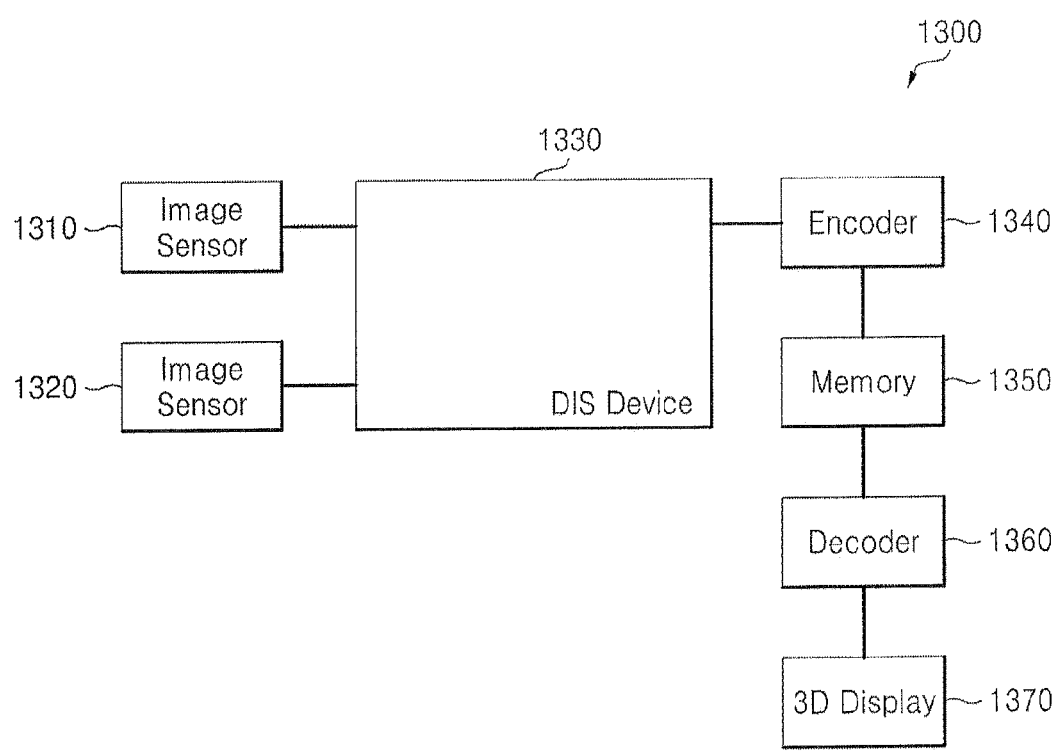
FIG. 13 is a block diagram of a digital image stabilization (DIS) system according to an embodiment of the inventive concept.

FIG. 13 is a block diagram of a DIS system 1300 according to further embodiments of the inventive concept. Referring to FIG. 13, the DIS system 1300 is a 3D display device. The DIS system 1300 includes a plurality of image sensors 1310 and 1320, a DIS circuit 1330, an encoder 1340, a memory 1350, a decoder 1360, and a 3D display 1370.

The operations of the image sensors 1310 and 1320, the DIS circuit 1330, and the encoder 1340 are the similar to those of the image sensors 11 and 13 or 110 and 130, the DIS circuit 20 or 200, and the encoder 43 or 430 illustrated in FIG. 1 or 10. Thus, detailed descriptions thereof will be omitted. The memory 1350 may store a plurality of 3D display frames output from the encoder 1340. The memory 1350 can be configured as non-volatile memory such as flash memory.

The decoder 1360 decodes the 3D display frames that have been encoded in order to display a 3D display image on the 3D display 1370. The 3D display 1370 displays the decoded 3D display frames, thereby providing a 3D image to a viewer.

As described above, according to some embodiments of the inventive concept, a background region based on depth information is used, so that jitter is easily and accurately eliminated from images used in a 3D display technique.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A method of stabilizing multiple perspective digital imagery, the method comprising:
    generating a plurality of successive depth maps based on the same number of successive image sets, each image set comprising a plurality of contemporaneous input image frames of multiple perspectives including at least an input image frame in a first-perspective group and an input image frame in a second-perspective group;
    determining a depth map background region in each of the depth maps responsive to the multiple perspectives;
    defining an image frame background region and an image frame foreground region in each of the image frames in one group among the first-perspective and second-perspective groups using the corresponding determined depth map background regions;
    calculating first global motion vectors between successive image frames in the one group using just the defined image frame background regions to stabilize the multiple perspective digital imagery;
    defining image frame background regions in each of the image frames in the other group among the first-perspective and second-perspective groups using the corresponding determined depth map background regions;
    calculating second global motion vectors of pixels within the image frame background regions between two consecutive image frames in the other group; and
    selecting the first global motion vectors or the second global motion vectors according to the magnitude changes of the first global motion vectors and the magnitude changes of the second global motion vectors,
    wherein the selecting the first global motion vectors or the second global motion vectors comprises:
    calculating the difference between the magnitudes of two global motion vectors among the first global motion vectors and the difference between the magnitudes of two global motion vectors among the second global motion vectors;
    comparing the calculated differences with a magnitude threshold value; and
    selecting the first global motion vectors or the second global motion vectors according to a result of the comparison.

2. The method of claim 1, further comprising selecting the one group according to image resolution.

3. The method of claim 1, wherein determining the depth map background region in each of the depth maps comprises:
    comparing a depth value of each pixel of the depth maps with a depth threshold value; and
    determining the pixels of the depth map background region in each of the depth maps according to results of the comparisons.

4. The method of claim 1, wherein the calculating the first global motion vectors comprises:
    calculating local motion vectors of pixels within the image frame background regions between two consecutive frames among the image frames in the one group; and
    calculating one first global motion vector of the two consecutive frames from their local motion vectors using a filter.

5. The method of claim 4, wherein the filter is a Gaussian filter, a median filter, or a mean filter.

6. The method of claim 4, wherein the calculating the local motion vectors of the two consecutive frames comprises calculating the local motion vectors based on block matching.

7. The method of claim 4, wherein the calculating the local motion vectors comprises calculating the local motion vectors based on feature point correspondence.

8. The method of claim 1, further comprising outputting the first global motion vectors to an encoder.

9. The method of claim 1, further comprising compensating for motion of the image frames in the first-perspective group and motion of the image frames in the second-perspective group using the first global motion vectors.

10. The method of claim 1, further comprising compensating for motion of the image frames in the first-perspective group and motion of the image frames in the second-perspective group using the selected global motion vectors.

11. A multiple perspective digital image stabilization circuit comprising:
    a depth map generator configured to generate successive depth maps based on successive image sets each comprising an input image frame in a first-perspective group and an input image frame in a second-perspective group and to determine depth map background regions in each of the depth maps;
    a selector configured to select one group between the first-perspective group and the second-perspective group according to image resolution;
    a background setup unit configured to define each of image frame background regions and image frame foreground regions in each of the image frames in the selected group using each of the determined depth map background regions;
    a motion estimator configured to calculate first global motion vectors between the image frames in the selected group using just each of the image frame background regions and calculate second global motion vectors of pixels within the image frame background regions between two consecutive image frames in the other group; and
    a comparator configured to select the first global motion vectors or the second global motion vectors according to the magnitude changes of the first global motion vectors and the magnitude changes of the second global motion vectors by:
    calculating the difference between the magnitudes of two global motion vectors among the first global motion vectors and the difference between the magnitudes of two global motion vectors among the second global motion vectors,
    comparing the calculated differences with a magnitude threshold value, and
    selecting the first global motion vectors or the second global motion vectors according to a result of the comparison.

12. The digital image stabilization circuit of claim 11, further comprising:

a first motion compensator configured to compensate for motion of the image frames in the first-perspective group using the global motion vectors; and a second motion compensator configured to compensate for motion of the image frames in the second-perspective group using the global motion vectors.

13. The digital image stabilization circuit of claim 11, wherein the motion estimator comprises:

a local motion estimation unit configured to calculate local motion vectors of pixels within the image frame background region in each of the image frames between two consecutive frames among the image frames in the selected group; and a global motion estimation unit configured to calculate one global motion vector from the local motion vectors using a filter.

14. The digital image stabilization circuit of claim 11, wherein the digital image stabilization circuit is an image signal processor.

15. A multiple perspective digital image stabilization system comprising:

a plurality of image sensors; and a digital image stabilization circuit configured to receive a first-perspective group of input image frames and a second-perspective group of input image frames from the image sensors, wherein the digital image stabilization circuit comprises:

a depth map generator configured to generate each depth map using one image frame in the first-perspective group and the corresponding one image frame in the second-perspective group and to determine a depth map background region in each of the depth maps;

a selector configured to select a group between the first-perspective group and the second-perspective group according to image resolution;

a background setup unit configured to define an image frame background region and an image frame foreground region in each of the image frames in the selected group using each of the determined depth map background regions;

a motion estimator configured to calculate first global motion vectors between consecutive image frames in the selected group based on just pixels in the image frame background regions and calculate second global motion vectors of pixels within the image frame background regions between two consecutive image frames in the other group; and a comparator configured to select the first global motion vectors or the second global motion vectors according to the magnitude changes of the first global motion vectors and the magnitude changes of the second global motion vectors by calculating the difference between the magnitudes of two global motion vectors among the first global motion vectors and the difference between the magnitudes of two global motion vectors among the second global motion vectors, comparing the calculated differences with a magnitude threshold value, and selecting the first global motion vectors or the second global motion vectors according to a result of the comparison.

16. The digital image stabilization system of claim 15, further comprising motion compensators configured to compensate for jitter motion of the image frames in the first-perspective group and jitter motion of the image frames in the second-perspective group, respectively, using the global motion vectors.

17. The digital image stabilization system of claim 16, further comprising:

a three-dimensional (3D) formatter configured to convert image frames output from the motion compensators into a 3D format and to output 3D display frames; and an encoder configured to compress the 3D display frames using the global motion vectors output from the motion estimator.

18. The digital image stabilization system of claim 15, wherein the digital image stabilization system is a 3D display device.

19. A multiple perspective digital image stabilization circuit comprising:

a depth map generator configured to generate depth maps, each depth map being generated using one of first-perspective input image frames and the corresponding one of second-perspective input image frames, and configured to determine a depth map background region in each of the depth maps;

a background setup block configured to define an image frame background region and an image frame foreground region in each of the first-perspective image frames using the corresponding one of the determined depth map background regions and to define the image frame back round region in each of the second-perspective image frames using the same one of the determined depth map background regions;

a motion estimation block configured to calculate first global motion vectors between the first-perspective image frames using just pixels within their defined image frame background regions and to calculate second global motion vectors between the second-perspective image frames using just the pixels within their defined image frame background regions;

a comparator configured to select the first global motion vectors or the second global motion vectors according to the magnitude change among the first global motion vectors and the magnitude change among the second global motion vectors by calculating the difference between the magnitudes of two global motion vectors among the first global motion vectors and the difference between the magnitudes of two global motion vectors among the second global motion vectors, comparing the calculated differences with a magnitude threshold value, and selecting the first global motion vectors or the second global motion vectors according to a result of the comparison; and motion compensators configured to compensate motion of the first-perspective image frames and motion of the second-perspective image frames, respectively, using the selected global motion vectors.

20. The digital image stabilization circuit of claim 19, wherein the digital image stabilization circuit is an image signal processor.

21. A multiple perspective digital image stabilization system comprising:

a first image sensor;

a second image sensor; and a digital image stabilization circuit configured to receive first-perspective input image frames and second-perspective input image frames from the first and second image sensors, respectively, wherein the digital image stabilization circuit comprises:

a depth map generator configured to generate depth maps, each depth map being generated using one of the first-perspective image frames and the corresponding one of the second-perspective image frames, and configured to determine a depth map background region in each of the depth maps;
a background setup block configured to define an image frame background region and an image frame foreground region in each of the first-perspective image frames using its corresponding determined depth map background region and to define the image frame background region in each of the second-perspective image frames using its corresponding determined depth map background region;
a motion estimation block configured to calculate first global motion vectors between just pixels in the defined background regions of the first image frames and to calculate second global motion vectors between just pixels in the defined background regions of the second image frames; and
a comparator configured to select the first global motion vectors or the second global motion vectors according to the magnitude changes of the first global motion vectors and the magnitude changes of the second global motion vectors by calculating the difference between the magnitudes of two global motion vectors among the first global motion vectors and the difference between the magnitudes of two global motion vectors among the second global motion vectors, comparing the calculated differences with a magnitude threshold value, and selecting the first global motion vectors or the second global motion vectors according to a result of the comparison.

* * * * *